United States Patent
Kobayashi et al.

(10) Patent No.: US 7,369,196 B2
(45) Date of Patent: May 6, 2008

(54) COLOR FILTER (75) Inventors: Hironori Kobayashi, Tokyo (JP); Kaori Yamashita, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 329 days.

(21) Appl. No.: 11/232,589

(22) Filed: Sep. 22, 2005

(65) Prior Publication Data
US 2006/0066779 A1  Mar. 30, 2006

(30) Foreign Application Priority Data
Sep. 28, 2004  (JP) ............................ 2004-282321

(51) Int. Cl.
*G02F 1/1135* (2006.01)
*G03F 1/00* (2006.01)
(52) U.S. Cl. ...................... 349/106; 430/7; 349/110
(58) Field of Classification Search ........ 349/106–111; 430/7
See application file for complete search history.

(56) References Cited
U.S. PATENT DOCUMENTS

| 6,450,635 | B1 | 9/2002 | Okabe et al. | |
| 7,233,373 | B2 * | 6/2007 | Katagami et al. | 349/113 |
| 7,298,435 | B2 * | 11/2007 | Katagami et al. | 349/106 |
| 2004/0038138 | A1 | 2/2004 | Kiguchi et al. | |
| 2004/0229139 | A1 * | 11/2004 | Tanaka et al. | 430/7 |

FOREIGN PATENT DOCUMENTS

| JP | 06-051325 | * | 2/1994 |
| JP | 06-208020 | * | 7/1994 |
| JP | 2004-212900 | | 7/2004 |

* cited by examiner

*Primary Examiner*—Toan Ton
(74) *Attorney, Agent, or Firm*—Seyfarth Shaw LLP (57) ABSTRACT

The main objection of the present invention is to provide a high quality color filter having a colored layer formed by ink jet method and without color irregularity, a void, or the like.

To achieve the object, the present invention provides a color filter comprising a base material, a light shielding part having a plurality of linear light shielding parts formed by a predetermined equal interval on the base material and interlocking light shielding parts for interlocking two of the light shielding parts adjacent by a predetermined interval, and colored layers formed between each of the linear light shielding parts so as to cover the interlocking light shielding parts, wherein the interlocking light shielding parts are formed such that the width of the interlocking light shielding parts at the side part of the linear light shielding parts is narrower than the width of the interlocking light shielding parts at the central part between two of the linear light shielding parts adjacent, or the linear light shielding parts and the interlocking light shielding parts are formed so as not to be contacted, and furthermore, the colored layers are formed by the ink jet method.

3 Claims, 8 Drawing Sheets

COLOR FILTER

BACKGROUND OF THE INVENTION

1. Field of the Invention

The present invention relates to a high quality color filter without a void, or the like, to be used for a liquid crystal display apparatus.

2. Description of the Related Art

Recently, with the development of the personal computers, in particular, the development of the portable personal computers, demand for a liquid crystal display, especially a color liquid crystal display tends to be increased. However, the color liquid displays are expensive; therefore, a request that the cost should be reduced has been increasing. In particular, a request that the cost of their color filters, which accounts for a high ratio in the total cost, should be reduced has been raised.

Such a color filter, in general, comprises colored patterns of three primary colors of red (R), green (G) and blue (B) so that liquid crystals are operated as a shutter by switching on or off the electrodes each corresponding to the pixels of A, G and B. Thereby, color display can be provided according to light transmission to the each pixel of R, G and B.

As the production methods for a color filter executed conventionally, for example, a dye method, a pigment dispersion method, or the like can be presented. However, according the methods, in any case, the same step should be repeated for three times for coloring the three colors of R, G and B so that problems are involved in that the cost is increased or the yield is lowered due to the repetition of the steps.

Then, a method of forming a photo catalyst containing layer on a base material, using a photo catalyst containing layer forming coating solution containing a photo catalyst and a material to have the characteristic change by the function of the photo catalyst according to the energy irradiation, and exposing in a pattern so as to form a pattern with the characteristic change, or the like has been discussed by the present inventors (Japanese Patent Application Laid-Open (JP-A) No. 2001-074928). According to this method, a colored layer can be formed easily, utilizing the characteristic difference of the above-mentioned photo catalyst containing layer.

Moreover, as an application of the method, also a method of directing an energy to a patterning substrate comprising a transparent base material, a light shielding part formed on the base material, and a photo catalyst containing layer formed so as to cover the light shielding part from the base material side for changing the characteristic of the photo catalyst containing layer only in the region without the formation of the light shielding part is discussed by the present inventors (JP-A No. 2004-212900). According to the method, it is advantageous in that the pattern with the characteristic changed can be formed without using a photo mask, or the like, and a method of, for example, utilizing the same at the time of forming a striped colored layer used for a striped color filter or a zigzag colored layer used for an IPS type color filter is also discussed.

Figure 10A:
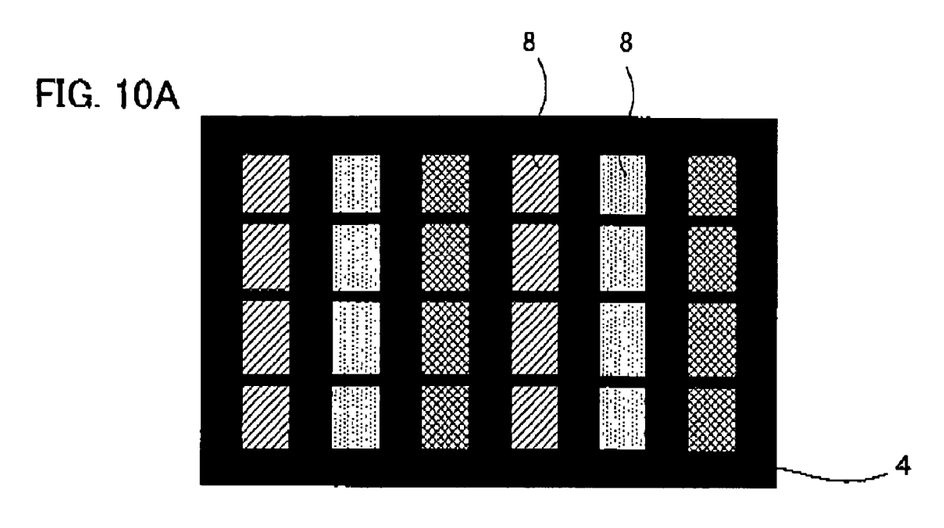
FIGS. 10A and 10B are explanatory diagrams for explaining the conventional color filter.
Figure 10B:
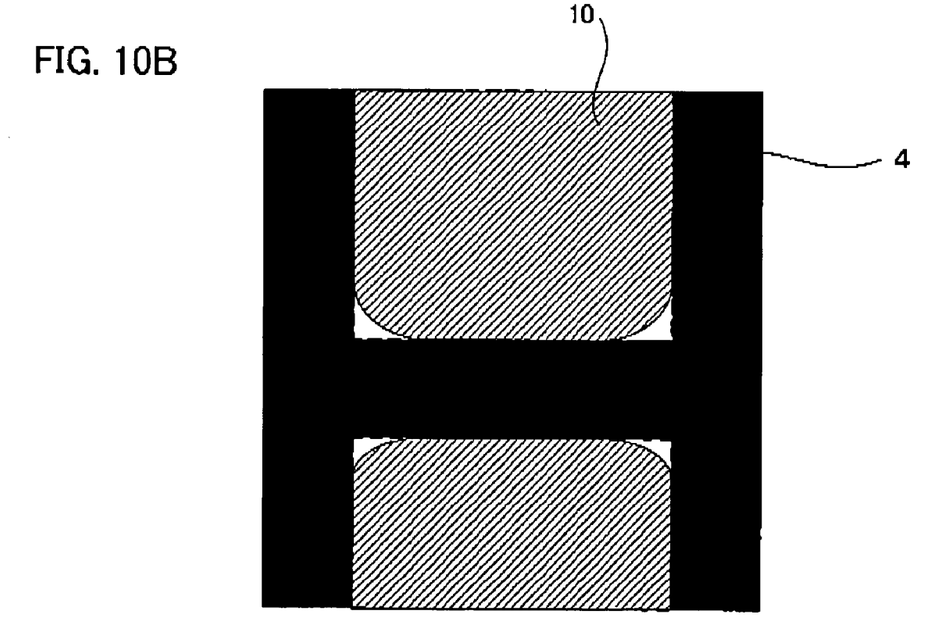

Here, according to a color filter having a striped colored layer or a colored layer of an IPS type color filter, since a light shielding part 4 is formed so as to be crossed with each colored layer 8 for example as shown in FIG. 10A, in general, the colored layers are formed by coating a colored layer forming coating solution not only of the pattern for forming the colored layers, that is, the opening parts sectioned for the light shielding parts for forming the colored layer but also on the light shielding parts crossing with the pattern so as to form the colored layers. However, in the case the above-mentioned method of exposing the semiconductor photo catalyst containing layer from the base material side is used, the characteristic of the semiconductor photo catalyst containing layer only in the opening parts sectioned by the light shielding parts is changed without changing the characteristic of the semiconductor photo catalyst containing layer on the light shielding parts crossing with each pattern. Therefore, in the case the colored layer forming coating solution is coated, the colored layer forming coating solution cannot be adhered onto the semiconductor photo catalyst containing layer on the light shielding part crossing with the above-mentioned colored layer so that the colored layer forming coating solution 10 cannot be spread neatly to the end parts of the opening parts sectioned by the light shielding parts 4 as shown in for example FIG. 10B so that irregularity or a void can be generated in the colored layer.

Moreover, as another example of a production method for a color filter, a method of forming a bank for storing a colored layer forming coating solution for forming a colored layer on a base material, applying a plasma process to the bank with a fluorine composition as the introducing gas so as to have the bank as liquid repellent, and forming a colored layer by the ink jet method is also proposed (JP-A No. 2000-187111). Also in this case, the colored layer forming coating solution cannot be adhered on the liquid repellent bank to be crossed with the striped colored layer, or the like so that as in the above-mentioned case, the colored layer forming coating solution cannot be spread neatly to the end parts of the opening parts sectioned by the light shielding parts, thereby irregularity or a void can be generated in the colored layer.

SUMMARY OF THE INVENTION

Therefore, a high quality color filter having a colored layer formed by ink jet method and without color irregularity, a void, or the like is desired to be provided.

The present invention provides a color filter comprising a base material, a light shielding part having a plurality of linear light shielding parts formed by a predetermined equal interval on the base material and interlocking light shielding parts for interlocking two of the light shielding parts adjacent by a predetermined interval, and colored layers formed between each of the linear light shielding parts so as to cover the interlocking light shielding parts, wherein the interlocking light shielding parts are formed such that the width of the interlocking light shielding parts at the side part of the linear light shielding parts is narrower than the width of the interlocking light shielding parts at the central part between two of the linear light shielding parts adjacent, or the linear light shielding parts and the interlocking light shielding parts are formed so as not to be contacted, and furthermore, the colored layers are formed by the ink jet method.

According to the present invention, since the interlocking light shielding parts formed between the adjacent opening parts have the shape mentioned above, the colored layer forming coating solution for forming the colored layers can be spread easily to the portion easily generating a void, or the like in the colored layer in a common color filter. Thereby, a high quality color filter without color irregularity, a void, or the like can be provided.

Moreover, according to the above-mentioned invention, a semiconductor photo catalyst containing layer containing a semiconductor photo catalyst and an organopolysiloxane can be formed so as to cover the above-mentioned base material and the above-mentioned light shielding part. Since the semiconductor photo catalyst containing layer contains a semiconductor photo catalyst and an organopolysiloxane, according to the function of the semiconductor photo catalyst accompanied by the energy irradiation, the contact angle with respect to a liquid can be lowered. Therefore, by using the semiconductor photo catalyst containing layer and irradiating the energy from the above-mentioned base material side, a lyophilic region can be provided easily on the above-mentioned opening parts and a liquid repellent region on the above-mentioned light shielding part so that the colored layers can be formed easily utilizing the wettability difference.

Moreover, according to the above-mentioned invention, the above-mentioned light shielding part may contain a fluorine. Since the above-mentioned light shielding part is liquid repellent, the colored layers can be formed easily, utilizing the wettability difference of the opening parts and the light shielding part.

According to the present invention, a colored layer can be formed by the ink jet method without avoid, color irregularity, or the like so that the effect of providing a high quality color filter can be achieved.

DESCRIPTION OF THE PREFERRED EMBODIMENT

The present invention relates to a high quality color filter having a highly precise pattern without a void, or the like. Hereinafter, the color filter of the present invention will be explained in detail.

A color filter of the present invention comprising a base material, a light shielding part having a plurality of linear light shielding parts formed by a predetermined equal interval on the base material and interlocking light shielding parts for interlocking two of the light shielding parts adjacent by a predetermined interval, and colored layers formed between each of the linear light shielding parts so as to cover the interlocking light shielding parts, wherein the interlocking light shielding parts are formed such that the width of the interlocking light shielding parts at the side part of the linear light shielding parts is narrower than the width of the interlocking light shielding parts at the central part between two of the linear light shielding parts adjacent, or the linear light shielding parts and the interlocking light shielding parts are formed so as not to be contacted, and furthermore, the colored layers are formed by the ink jet method.

Figure 1:
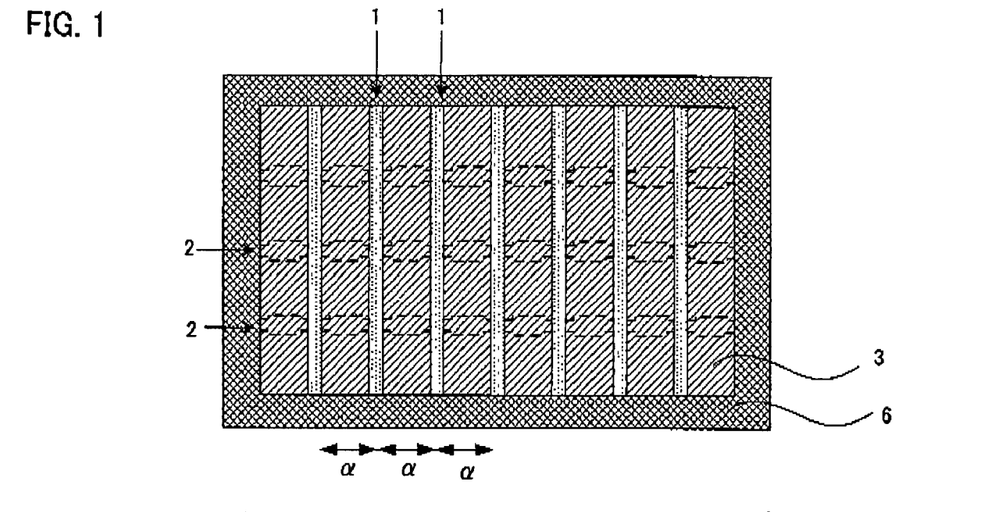
FIG. 1 is a process diagram showing an example of the color filter of the present invention.
Figure 2:
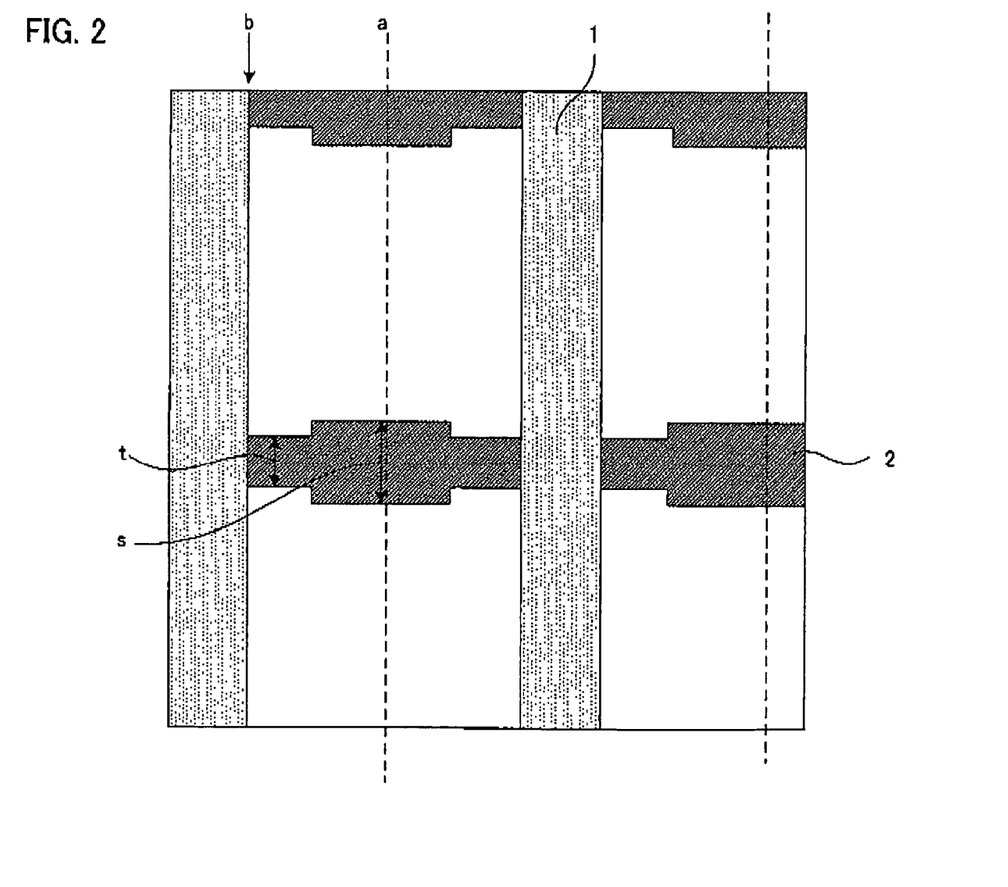
FIG. 2 is an explanatory diagram for explaining the opening parts sectioned by the light shielding parts of a color filter according to the present invention.
Figure 3:
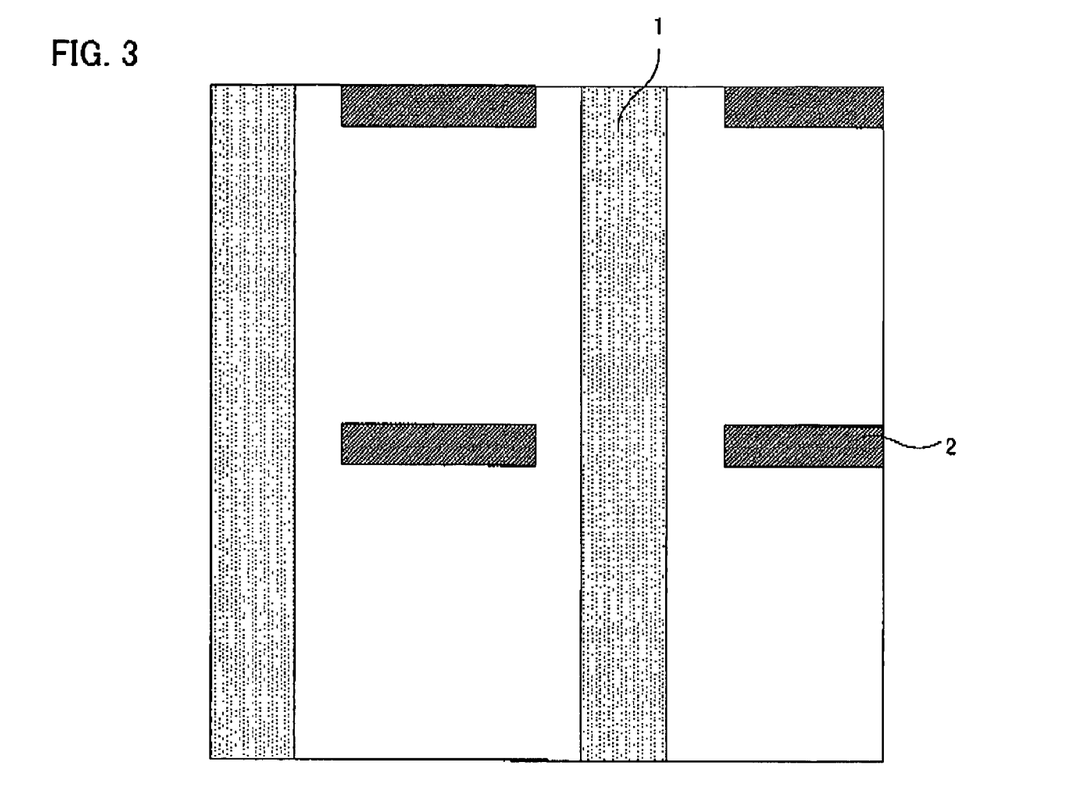
FIG. 3 is an explanatory diagram for explaining the opening parts sectioned by the light shielding parts of a color filter according to the present invention.

As shown in for example FIG. 1, a color filter according to the present invention comprises a base material (not shown), a light shielding part having a plurality of linear light shielding parts 1 formed by an equal interval α on the base material and interlocking light shielding parts 2 for interlocking two of the adjacent light shielding parts 1, and colored layers 3 formed between two of the adjacent linear light shielding parts 1 so as to cover the interlocking light shielding parts 2 by the ink jet method. For example as shown in FIG. 2, the interlocking light shielding parts are formed such that the width t of the interlocking light shielding parts 2 of the linear light shielding part 1 side part (the side shown by b in the figure) is formed narrower than the width s of the interlocking light shielding parts 2 at the central part between the adjacent two linear light shielding parts (the portion shown by a in the figure), or for example as shown in FIG. 3, the linear light shielding parts 1 and the interlocking light shielding parts 2 are formed so as not to be contacted.

In general, for example as shown in FIG. 1, a frame light shielding part 6 is formed in a region outside the region with the colored layers 3 formed.

Figure 11:
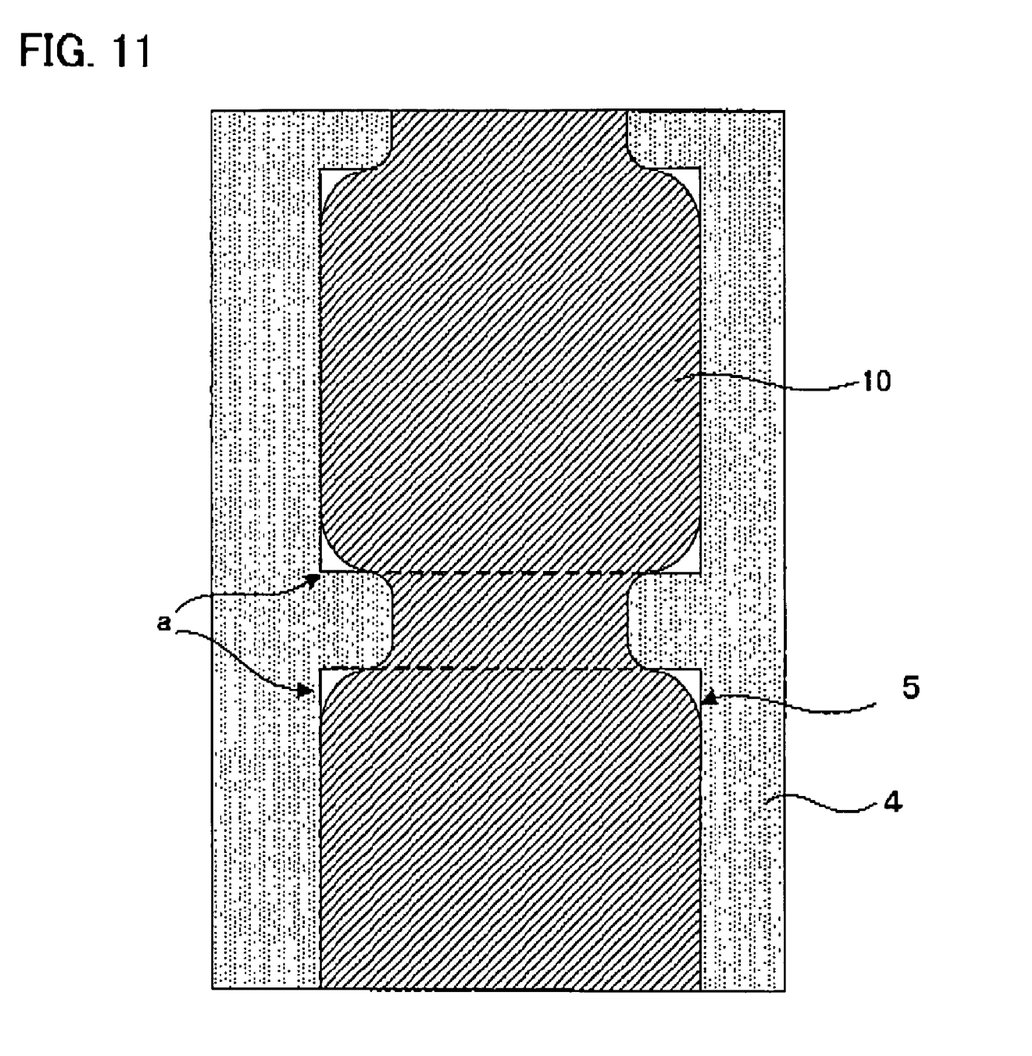
FIG. 11 is another explanatory diagram for explaining the conventional color filter.

According to an ordinary color filter, in the case a colored layer is formed by the ink jet method, utilizing a lyophilic and liquid repellent pattern with a liquid repellent light shielding part and a lyophilic opening part, the light shielding parts between the adjacent opening parts are liquid repellent. Therefore, for example as shown in FIG. 11, the colored layer forming coating solution 10 can hardly be spread between the opening parts 5 sectioned by the light shielding parts 4 so that the colored layer forming coating solution can hardly be coated in the vicinity of the top end part a of the corner part of the opening part 5. Therefore, a problem is involved in that such as color irregularity or a void is generated in the formed colored layer.

However, according to the present invention, the width of the interlocking light shielding parts is formed narrower or the interlocking light shielding parts are not formed near the corners of each opening parts of the light shielding part, whereat the colored layer forming coating solution can hardly be spread That is, the opening parts are provided adjacently with each other or the opening parts are provided continuously near the corners of the opening parts. Therefore, at the time of forming a colored layer by the ink jet method, even in the case the interlocking light shielding part surface is liquid repellent, the colored layer forming coating solution can be spread evenly near the corners of the opening parts sectioned by the light shielding part. Thereby, a high quality color filter without color irregularity, a void, or the like can be provided.

Hereinafter, each configuration of the color filter of the present invention will be explained in detail.

1. Light Shielding Part

Figure 4:
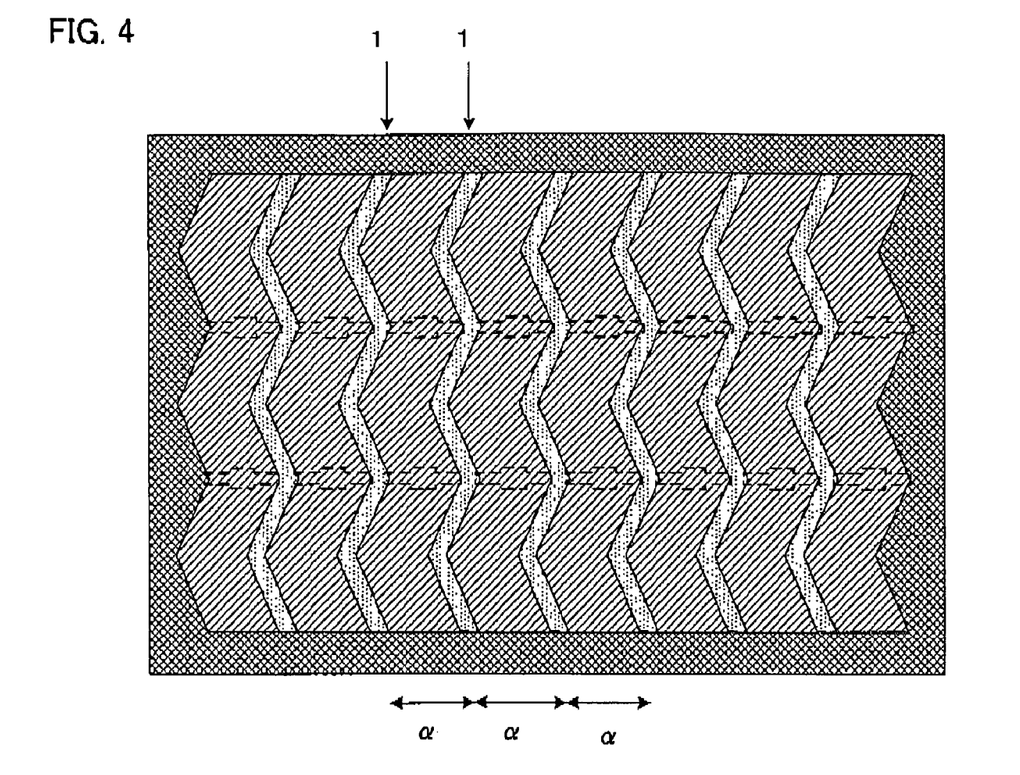
FIG. 4 is an explanatory diagram for explaining the opening parts sectioned by the light shielding parts of a color filter according to the present invention.

First, the light shielding part used for the color filter of the present invention will be explained. The light shielding part used for the color filter of the present invention comprises linear light shielding parts and interlocking light shielding parts formed on a base material. The linear light shielding parts in the present invention are not particularly limited as long as a plurality thereof is formed by an equal interval with a predetermined interval on the base material. For example, as shown in FIG. 1, the linear light shielding parts 1 may be formed in a straight line form by a plurality with an equal interval of a predetermined gap $\alpha$. Moreover, for example as shown in FIG. 4, the linear light shielding parts 1 may be formed zigzag with a plurality by an equal interval of a predetermined gap $\alpha$, or the like. Furthermore, at the time, the linear light shielding parts may have ruggedness in the width direction. Moreover, "formed by a plurality with an equal interval" denotes that the center lines of each of the linear light shielding parts are formed by an equal interval.

On the other hand, the interlocking light shielding parts for interlocking the adjacent two linear light shielding parts by a predetermined interval are formed such that the width of the interlocking light shielding parts at the side part of the linear light shielding part is narrower than the width of the interlocking light shielding parts at the central part between the adjacent two linear light shielding parts, or the linear light shielding parts and the interlocking light shielding parts are formed so as not to be contacted. In the case the linear light shielding parts are formed in a straight line form, the interlocking light shielding parts in general are formed orthogonal to the linear light shielding parts.

In the case the width of the interlocking light shielding parts at the side part of the linear light shielding part is formed narrower than the width of the interlocking light shielding parts at the central part between the adjacent two linear light shielding parts, the adjacent opening parts are provided closely near the corners of the opening parts sectioned by the light shielding part. Therefore, spreading of the colored layer forming coating solution to the opening parts can hardly be inhibited by the interlocking light shielding parts so that a void, color irregularity, or the like of the colored layer can hardly be generated also at the corners of the opening parts, whereat a void, or the like can easily be generated in a common color filter. Here, the "central part between the adjacent two linear light shielding parts" denotes the inner side two regions out of the regions provided by dividing the distance between the adjacent linear light shielding parts equally into four. Moreover, "the side part of the linear light shielding parts" denotes the region closer to the linear light shielding parts than the central part between the adjacent two linear light shielding parts, that is, the outer side two regions out of the regions provided by dividing the distance between the adjacent two linear light shielding parts equally into four.

Here, "the width of the interlocking light shielding parts at the side part of the linear light shielding part is formed narrower than the width of the interlocking light shielding parts at the central part between the adjacent two linear light shielding parts" denotes that the average width of the interlocking light shielding parts at the side part of the linear light shielding parts is narrower than the average width of the interlocking light shielding parts at the central part. Specifically, with the premise that the average width of the interlocking light shielding parts at the central part between the adjacent two linear light shielding parts is 1, the average width of the interlocking light shielding parts formed on the side part of the linear light shielding part is preferably in a range of 0.05 to 0.95, more preferably in a range of 0.1 to 0.9, and particularly preferably in a range of 0.1 to 0.7. Moreover, at the time, the average width of the interlocking light shielding parts formed on the side part of the linear light shielding parts is preferably in a range of 5 µm to 200 µm, more preferably in a range of 10 µm to 150 µm, and particularly preferably in a range of 10 µm to 100 µm. According to the range, at the time of forming the colored layer, the colored layer forming coating solution for forming the colored layer can be spread evenly at the opening parts without the influence of the liquid repellency of the interlocking light shielding parts formed between the adjacent opening parts.

Moreover, the average width of the interlocking light shielding parts formed at the central part between the adjacent two linear light shielding parts is preferably in a range of 5 µm to 300 µm, more preferably in a range of 10 µm to 200 µm, and particularly preferably in a range of 10 µm to 150 µm. In the case it is wider than the range, the colored layer forming coating solution can hardly be spread at the central part between the adjacent two linear light shielding parts so that a void may be generated in the colored layer.

Figure 5:
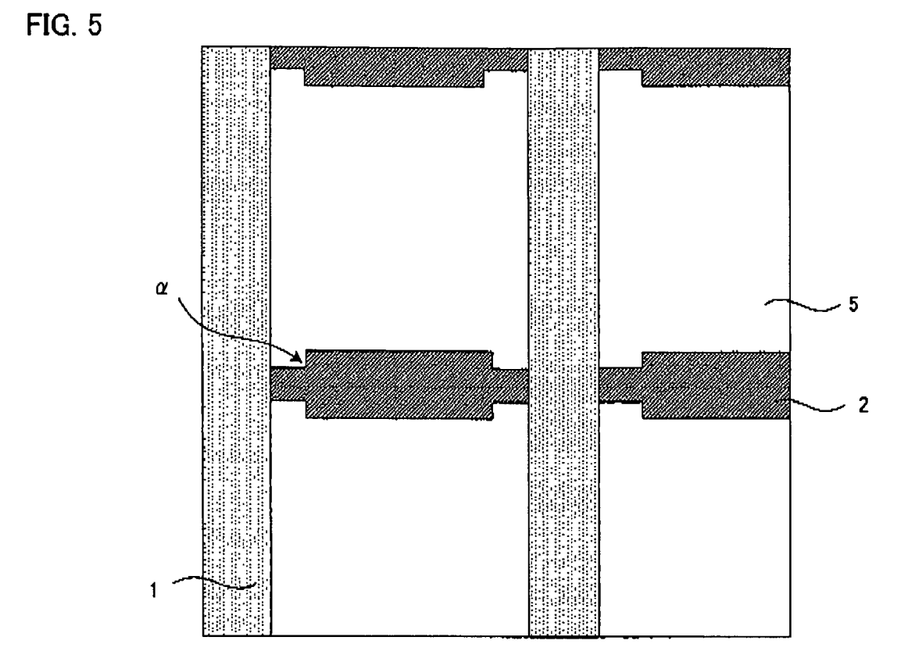
FIG. 5 is an explanatory diagram for explaining the opening parts sectioned by the light shielding parts of a color filter according to the present invention.
Figure 6:
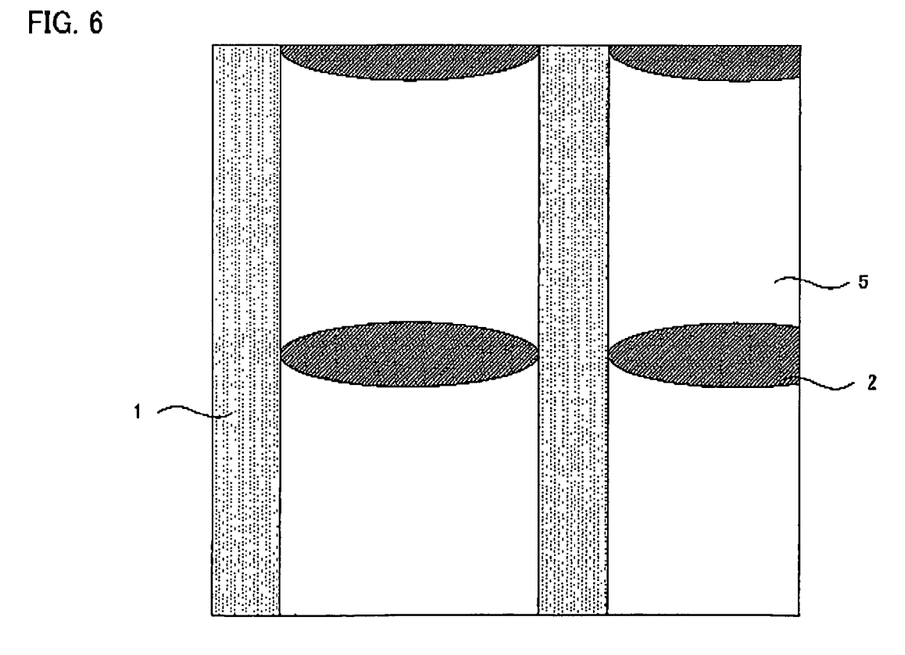
FIG. 6 is an explanatory diagram for explaining the opening parts sectioned by the light shielding parts of a color filter according to the present invention.
Figure 7:
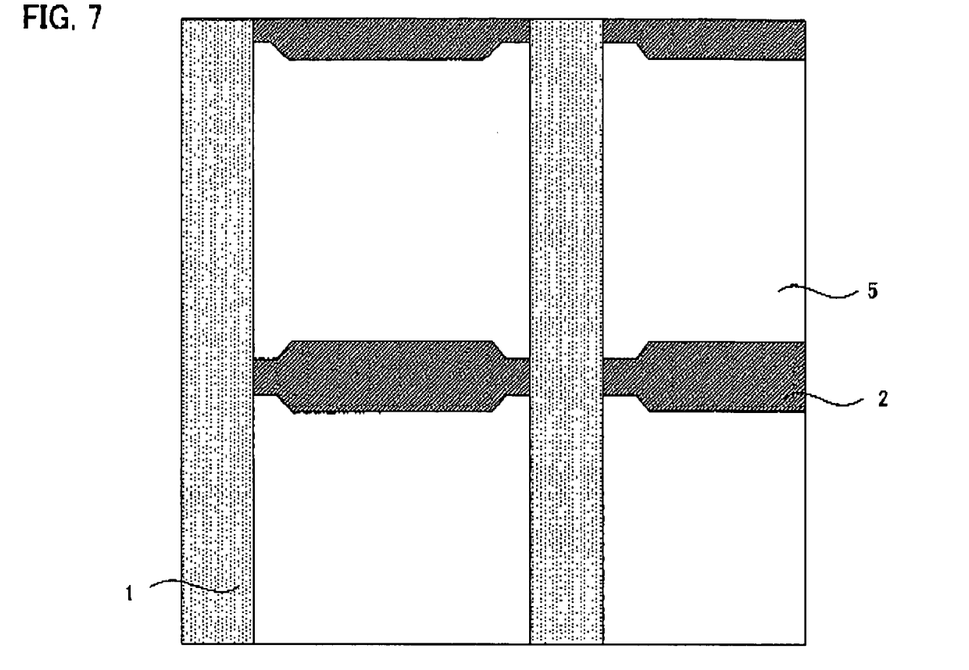
FIG. 7 is an explanatory diagram for explaining the opening parts sectioned by the light shielding parts of a color filter according to the present invention.

Moreover, at the time, the interlocking light shielding parts may have a shape having the width changed stepwise by a plurality of stages for example as shown in FIG. 5, or they may have a shape having the width changed moderately for example as shown in FIG. 6. In the present invention, in the case the width is changed stepwise as mentioned above, the colored layer forming coating solution may hardly be spread at a portion with the opening part shape provided as a right angle or an acute angle as shown by $\alpha$ in FIG. 5. Therefore, according to the present invention, for example as shown in FIG. 7, it is preferable that the interlocking light shielding part shape is adjusted so as to have the opening part corner shape as an obtuse angle or a curved line.

On the other hand, in the case the interlocking light shielding parts and the linear light shielding parts are formed so as not to be contacted, the opening parts can be provided continuously near the corners of the opening parts, whereat a void, color irregularity, or the like of the colored layer can easily be generated. Therefore, at the time of coating the colored layer forming coating solution by the ink jet method, the colored layer forming coating solution can be spread evenly also near the corners of the opening parts so that a void, color irregularity, or the like can hardly be generated in the colored layer. The "above-mentioned interlocking light shielding parts and the linear light shielding parts are formed so as not to be contacted" denotes that a gap is provided between the interlocking light shielding parts and the linear light shielding parts. In this case, the interlocking light shielding parts may be formed so as not to be contacted with any linear light shielding parts provided on the both sides of the interlocking light shielding part, or they may be formed so as not to be contacted only with the linear light shielding parts on one side.

The distance of the gap between the interlocking light shielding parts and the linear light shielding parts may be selected optionally according to the size of the opening parts, or the like. In the case the interlocking light shielding parts are formed so as not to be contacted only with the linear light shielding parts on one side, with the premise that the distance between the adjacent two linear light shielding parts is 1, it is preferably in a range of 0.01 to 0.99, and more preferably in a range of 0.05 to 0.75. Moreover, the distance of the gap is preferably in a range of 5 µm to 400 µm, more preferably in a range of 10 μm to 250 μm, and particularly preferably in a range of 20 μm to 150 μm.

On the other hand, in the case the interlocking light shielding parts are formed so as not to be contacted with any linear light shielding parts provided on the both sides of the interlocking light shielding part, with the premise that the distance between the adjacent two linear light shielding parts is 1, the distance between the interlocking light shielding parts and the linear light shielding parts is preferably in a range of 0.01 to 0.49, and more preferably in a range of 0.03 to 0.48. Moreover, the distance of the gap is preferably in a range of 5 μm to 200 μm, more preferably in a range of 10 μm to 175 μm, and particularly preferably in a range of 20 μm to 150 μm.

Figure 8:
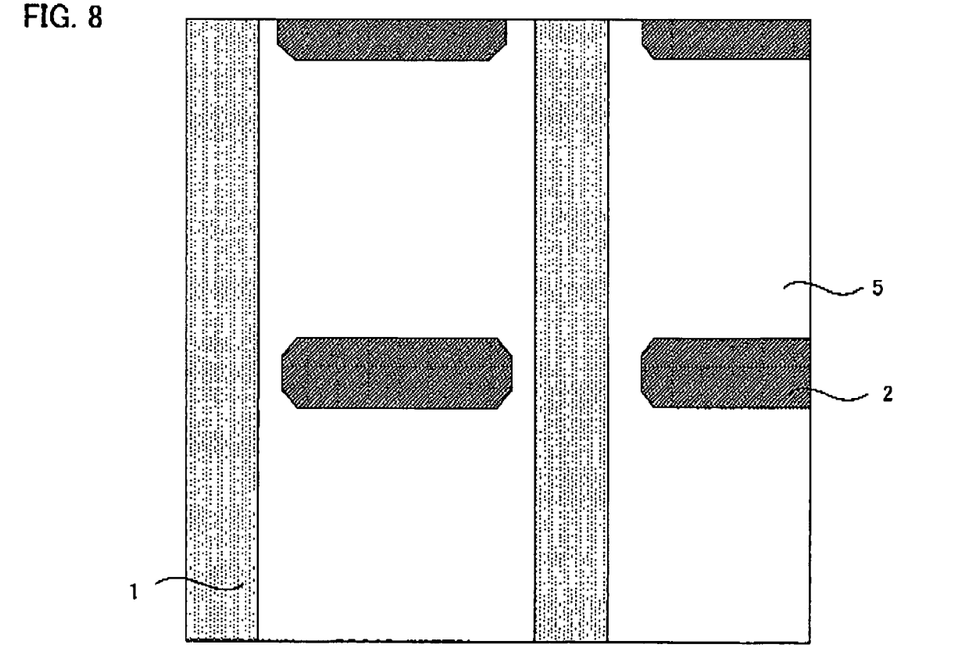
FIG. 8 is an explanatory diagram for explaining the opening parts sectioned by the light shielding parts of a color filter according to the present invention.

Moreover, at the time, the shape of the interlocking light shielding parts is not particularly limited. For example, it may be rectangular, elliptical, or the like. In the present invention, in the case the shape of the interlocking light shielding parts is rectangular, since the colored layer forming coating solution may hardly be spread in the region between the interlocking light shielding parts and the linear light shielding parts, it is preferable that the interlocking light shielding parts 2 are formed so as to have the shape of the interlocking light shielding parts having the corners of the rectangular shape as an obtuse angle or a curved line for example as shown in FIG. 8.

Figure 9:
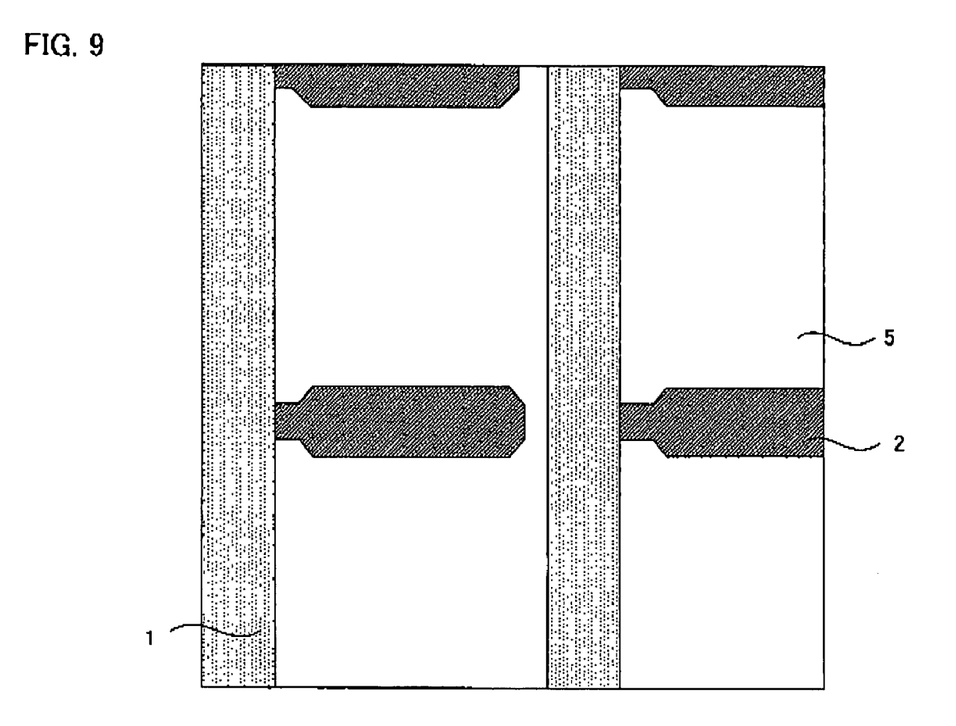
FIG. 9 is an explanatory diagram for explaining the opening parts sectioned by the light shielding parts of a color filter according to the present invention.

In the present invention, for example as shown in FIG. 9, the interlocking light shielding parts 2 may be formed such that the interlocking light shielding parts 2 at the side part of the linear light shielding parts 1 on one side is formed narrower than he width of the interlocking light shielding parts 2 at the central part between the adjacent two linear light shielding parts 1 so that the linear light shielding parts 1 on the other side are not contacted with the interlocking light shielding parts 2.

As the method for forming the light shielding part comprising the linear light shielding parts and the interlocking light shielding parts as mentioned above, the same method and materials as those for common a color filter comprising a striped colored layer or a colored layer for the IPS type color filter can be used.

For example, the linear light shielding parts and the interlocking light shielding parts may be formed so as to have the above-mentioned shape respectively by forming a metal thin film of a chromium or the like with about a 1,000 to 2,000 Å thickness by the sputtering method, the vacuum deposition method, or the like, and patterning the thin film, As the patterning method, an ordinary patterning method such as the sputtering can be used.

A method may be one by which a layer that contains light-shielding particles such as carbon particulates, metal oxides, inorganic pigments and organic pigments in a resin binder is formed in a pattern. As the resin binders that can be used, a polyimide resin, acrylic resin, epoxy resin, polyacrylamide, polyvinyl alcohol, gelatin, casein, cellulose and the like can be used singularly or in combination of two or more kinds, and furthermore a photosensitive resin and an O/W emulsion type resin composition such as emulsified reactive silicone can be used. A thickness of such the resinous light-shielding part can be set in the range of 0.5 to 10 μm. As a method of patterning such the resinous light-shielding part, methods such as a photolithography method and a printing method that are generally used can be used.

Moreover, in the present invention, the light shielding part mentioned above may be formed by the thermal transfer method. According to the thermal transfer method for forming the light shielding part in general, a light shielding part is formed by disposing on a base material a thermal transfer sheet with a photo thermal conversion layer and a light shielding part transfer layer provided on one side of a transparent film base material, and directing an energy to the area for forming the light shielding part so as to transfer the light shielding part transfer layer onto the base material. The film thickness of the light shielding part to be formed by the thermal transfer method is in general 0.5 μm to 10.0 μm, and in particular about 0.8 μm to 5.0 μm.

The light shielding part to be transferred by the thermal transfer method in general comprises a light shielding material and a binding agent. As the light shielding material, inorganic particles of a carbon black, a titanium black, or the like can be used. The particle size of the light shielding material is preferably in a range of 0.01 μm to 1.0 μm, in particular, in a range of 0.03 μm to 0.3 μm.

Moreover, as to the binding agent, it is preferable that it has a resin composition having the thermoplastic property and the thermosetting property, and it is preferable that it has a thermosetting functional group, a resin material having a softening point preferably in a range of 50° C. to 150° C., in particular, 60° C. to 120° C., and a hardening agent, or the like. As such a material, specifically, an epoxy compound having two or more epoxy groups in one molecule, a combination of an epoxy resin and a potential hardening agent thereof, or the like can be presented. Moreover, as the potential hardening agent for an epoxy resin, a hardening agent not showing the reactivity with an epoxy resin up to a certain temperature and having the molecular structure change to show the reactivity with the epoxy resin at the time it reaches at the activating temperature by heating can be used. Specifically, a neutral salt or complex of an acidic or basic compound having the reactivity with an epoxy resin, a block compound, a high melting point substance, and a micro capsule contained substance can be presented. Moreover, in the light shielding part, in addition to the materials, a mold releasing agent, a bonding auxiliary agent, an antioxidant, a dispersing agent, or the like may be contained.

Here, according to the present invention, it is preferable that the above-mentioned light shielding part is a liquid repellent region and the opening parts sectioned by abovementioned the light shielding part are a lyophilic region. Thereby, the colored layer to be described later can be formed by for example the ink jet method, utilizing the lyophilic and liquid repellent patterns so as to provide a high quality color filter without color mixture of the adjacent colored layers of different colors, or the like. Moreover, in this case, near the corners of the each opening parts of the light shielding part, whereat the colored layer forming coating solution can hardly be spread, the liquid repellent regions can be provided narrowly so as to provide the adjacent lyophilic regions closely with each other, or the lyophilic regions can be provided continuously without formation of the liquid repellent regions. Thereby, the colored layer forming coating solution can be spread more evenly also near the corners of the each opening parts.

Here, the liquid repellent region denotes a region having a large contact angle with respect to a liquid, that is, a region having a poor wettability with respect to a colored layer forming coating solution for forming the colored layer to be described later.

In the present invention, a region about which the contact angle with a liquid is 1° or lower than that of an adjacent region is defined as a lyophilic region, and a region about which the contact angle with a liquid is 1° or higher than that of an adjacent region is defined as a liquid repellent region.

As to the contact angle with respect to a liquid on the above-mentioned light shielding part, that is, the liquid repellent region, specifically the contact angle with respect to a liquid of 40 mN/m is 10° or more, preferably, the contact angle with respect to a liquid having a 30 mN/m surface tension is 10° or more, and particularly preferably the contact angle with respect to a 20 mN/m surface tension is 10° or more. In the case the contact angle with respect to the above-mentioned liquid is small in a liquid repellent region, due to the insufficient liquid repellency, the colored layer forming coating solution may be adhered also on the liquid repellent region in the case of coating the colored layer forming coating solution for forming the colored layer by the ink jet method, hardening and forming, or the like.

Moreover, on the above-mentioned opening parts, that is, the lyophilic region, the contact angle with respect to a liquid of 40 mN/m is less than 9°, preferably, the contact angle with respect to a liquid having a 50 mN/m surface tension is 10° or less, and particularly preferably the contact angle with respect to a 60 mN/m surface tension is 10° or less. In the case the contact angle with respect to the liquid in the opening parts, that is, the lyophilic region is high, the above-mentioned colored layer forming coating solution may be repelled also in the lyophilic region so that the colored layer may hardly be formed due to insufficient spreading of the colored layer forming coating solution at the time of coating the colored layer forming coating solution.

The contact angle with respect to a liquid here is obtained from the results or a graph of the results of measuring (30 seconds after of dropping liquid droplets from a micro syringe) the contact angle with respect to liquids having various surface tensions using a contact angle measuring device (CA-Z type manufactured by Kyowa Interface Science, Co., Ltd). Moreover, at the time of the measurement, as the liquids having the various surface tensions, wetting index standard solution manufactured by JUNSEI CHEMICAL CO., LTD. were used.

The method of providing the above-mentioned light shielding part as a liquid repellent region and the above-mentioned opening parts as a lyophilic region is not particularly limited. For example, a method of having the light shielding part itself as the liquid repellent region and the base material to be described later as the lyophilic region, or the like may be used. Moreover, a method of forming a liquid repellent layer on the light shielding part so as to provide a liquid repellent region and forming a lyophilic layer on the above-mentioned base material so as to provide a lyophilic region, or the like may be used as well.

In the present invention, in particular, it is preferable to use a method of forming a semiconductor photo catalyst containing layer containing a semiconductor photo catalyst and an organopolysiloxane so as to cover the base material to be described later and the above-mentioned light shielding part, or a method of using the above-mentioned light shielding part containing a fluorine.

In the case the above-mentioned semiconductor photo catalyst containing layer is used, since a variable layer to have the contact angle with respect to a liquid lowered by the function of the semiconductor photo catalyst accompanied by the energy irradiation can be provided, the region with the energy irradiation can be provided as a lyophilic region and the region without the energy irradiation can be provided as a liquid repellent region. Therefore, by forming the above-mentioned semiconductor photo catalyst containing layer so as to cover the base material and the light shielding part and having the energy irradiation from the base material side, only the opening parts without the light shielding part formation can easily be provided as a lyophilic region and the light shielding part without the energy irradiation can be provided as a liquid repellent region. Since the above-mentioned semiconductor photo catalyst containing layer sued for such a method will be explained later in detail, detailed explanation is omitted here.

On the other hand, also in the case the above-mentioned light shielding part contains a fluorine, the above-mentioned light shielding part can be used as a liquid repellent region. Here, the presence of the fluorine in the light shielding part can be confirmed by measuring the ratio of the fluorine element in the all elements detected form the surface of the light shielding part by the analysis with an X ray photoelectron spectrometer (XPS: ESCALAB 220i-XL). Moreover, the above-mentioned ratio of the fluorine at the time is preferably 10% or more.

As the method for accordingly introducing a fluorine into the light shielding part, it is preferable to use a method of using a resin light shielding part as the light shielding part and directing a plasma using a fluorine compound as the introducing gas. Thereby, the above-mentioned liquid repellent region and lyophilic region can easily be formed. According to the above-mentioned plasma irradiation, the fluorine compound can be introduced only to an organic substance. Therefore, by using an inorganic substance as the base material to be described later and directing the plasma on the entire surface, the fluorine compound can be introduced easily only onto to the above-mentioned light shielding part so that the light shielding part with the fluorine compound introduced can be provided as a liquid repellent region and the region with the base material exposed can be provided as a lyophilic region.

As the fluorine compound of the introducing gas used for such a method, for example, a carbon fluoride ($CF_4$), a fluorine nitride ($NF_3$), a sulfur fluoride (SF6), or the like can be presented Moreover, the above-mentioned plasma irradiation method is not particularly limited as long as the plasma is directed using a fluorine compound as the introducing gas so as to provide the above-mentioned light shielding part as a liquid repellent region. The plasma irradiation can be carried out either under a reduced pressure or an atmospheric pressure. According to the present invention, in particular, it is preferable to carry out the plasma irradiation under an atmospheric pressure. Thereby, since a pressure reduction device, or the like, is not needed, it is preferable in terms of the cost, the production efficiency, or the like. The atmospheric plasma irradiation conditions are as follows. For example, the power source output may be same as that used for a common atmospheric plasma irradiation device. Moreover, at the time, the distance between the plasma irradiation electrode and the above-mentioned light shielding part is about 0.2 mm to 20 mm, it is particularly preferably about 1 mm to 5 mm. Furthermore, the flow rate of a fluorine compound used as the above-mentioned introducing gas is about 1 L/min to 100 L/min, and it is particularly preferably about 5 L/min to 50 L/min. The substrate conveyance rate at the time is about 0.1 m/min to 10 m/min, and it is particularly preferably about 0.5 m/min to 5 m/min.

2. Colored Layer

Next, the colored layer used for the color filter of the present invention will be explained. The colored layer used for the color filter of the present invention is not particularly limited as long as it is formed between two of the abovementioned adjacent linear light shielding parts so as to cover the above-mentioned interlocking light shielding parts by the ink jet method.

Such a colored layer is formed in general with the three colors of red (R), green (G) and blue (B), and the coloring area can be set optionally.

Here, as the colored layer forming coating solution to be used for the formation of the colored layer, or the like, those used for the colored layer of a common color filter wherein the colored layer is formed by ink jet method can be used, and thus detailed explanation is omitted.

3. Base Material

Next, the base material used in the present invention will be explained. The base material used in the present invention is not particularly limited as long as the light shielding part and colored layer can be formed, and thus those conventionally used for a color filter can be used. Specifically, a transparent rigid material without flexibility, such as a quartz glass, a pyrex (registered trademark) glass, and a synthetic quartz plate, and a transparent flexible material having flexibility, such as a transparent resin film and an optical resin plate, or the like can be presented. Among these, since the 7059 glass manufactured by Corning Inc. is a material having a small thermal expansion coefficient having the excellent dimensional stability and the operativity in a high temperature heating process, and furthermore, it is a no-alkaline glass not containing an alkaline component in the glass, it is suitable for a color filter for color liquid crystal display based on an active matrix system. In the present invention, a transparent base material is used in general, but a reflective substrate and a substrate colored in white can be used as well. Moreover, the base material as needed with the surface process for preventing the alkaline elution and providing the gas barrier property, or the like applied can be used. Moreover, having the above-mentioned process of directing a plasma, or the like with an oxygen gas used as an introducing gas for having the surface to be lyophilic may be used as well.

As mentioned above, in the case the plasma irradiation using the above-mentioned fluorine compound as the introducing gas is carried out on the above-mentioned light shielding part, it is preferable to use the above-mentioned base material made of an inorganic material. In the case one made of an organic material is used, the fluorine compound is introduced not only to the light shielding part but also to the base material so that the opening parts can hardly be provided as a lyophilic region.

4. Color Filter

Next, the color filter of the present invention will be explained. The layer configuration, or the like of the color filter of the present invention is not particularly limited as long as it has the above-mentioned base material, the light shielding part having the above-mentioned shape, and the colored layer formed. For example, one having a protection layer, an ITO layer, or the like formed may be used as well. Moreover, the kind of the color filter of the present invention is not particularly limited. For example, it may be a color filter having a striped colored layer, or it may be a color filter used for the IPS type liquid crystal display apparatus, or the like.

Here, in the present invention, as mentioned above, the semiconductor photo catalyst containing layer containing a semiconductor photo catalyst and an organopolysiloxane may be formed so as to cover the above-mentioned base material and the light shielding part. According to the semiconductor photo catalyst containing layer, since a variable layer to have the contact angle with respect to a liquid lowered can be provided by the function of he semiconductor photo catalyst accompanied by the energy irradiation, the region with the energy irradiation can be provided as a lyophilic region and the region without the energy irradiation as a liquid repellent region. Therefore, by forming the semiconductor photo catalyst containing layer and directing the energy from the base material side, only the opening parts without the light shielding part formation can be provided as a lyophilic region easily and the light shielding parts without the energy irradiation as a liquid repellent region. Here in after such a semiconductor photo catalyst containing layer will be explained.

(Semiconductor Photo Catalyst Containing Layer)

The semiconductor photo catalyst containing layer used in the present invention is not particularly limited as long as it is a layer containing at least a semiconductor photo catalyst and an organopolysiloxane so as to have the contact angle with respect to a liquid lowered by the function of the semiconductor photo catalyst accompanied by the energy irradiation.

Hereinafter, the semiconductor photo catalyst, the organopolysiloxane, and the other components comprising such a semiconductor photo catalyst containing layer will be explained.

a. Semiconductor Photo Catalyst

First, the semiconductor photo catalyst used in the present invention will be explained. As the semiconductor photo catalyst used in the present invention, those known as photo semiconductors, such as a titanium dioxide ($TiO_2$), a zinc oxide (ZnO), a tin oxide ($SnO_2$), a strontium titanate ($SrTiO_3$), a tungsten oxide ($WO_3$), a bismuth oxide ($Bi_2O_3$), and an iron oxide ($Fe_2O_3$) can be presented, and one or two or more kinds as a mixture can be selected and used from them.

Although the function mechanism of such a semiconductor photo catalyst is not always clear, it is considered that a radical produced by the light irradiation changes the chemical structure of an organic substance by the direct reaction with a compound in the vicinity or by the active oxygen species generated under the presence of the oxygen and water. In the present invention, it is considered that the radical and the active oxygen species function on the organopolysiloxane in the semiconductor photo catalyst containing layer so as to lower the contact angle of its surface with respect to a liquid.

According to the present invention, in particular, a titanium dioxide can be used preferably since it has high band gap energy, it is chemically stable without the toxicity, and it can be obtained easily. There are an anatase type and a rutile type in the titanium dioxides, and either can be used in the present invention, however, the anatase type titanium dioxide is preferable. The anatase type titanium dioxide has a 380 nm or less excitation wavelength.

As the anatase type titanium dioxide, for example, a hydrochloric acid deflocculation type anatase type titania sol (STS-02 (average particle diameter 7 nm) manufactured by ISHIRAPA SANGYO KAISHA, LTD., ST-K01 manufactured by ISHIPARA SANGYO KAISHA, LTD.), a nitric acid deflocculation type anatase type titania sol (TA-15 (average particle diameter 12 nm) manufactured by Nissan Chemical Industries, Ltd.), or the like can be presented.

With a smaller particle diameter of the semiconductor photo catalyst, the semiconductor photo catalyst reaction can be generated effectively, and thus it is preferable. An average particle diameter of 50 nm or less is preferable, and use of a semiconductor photo catalyst of 20 nm or less is particularly preferable.

The semiconductor photo catalyst content in the semiconductor photo catalyst containing layer used in the present invention can be set in a range of 5 to 60% by weight, preferably in a range of 20 to 40% by weight. Moreover, the thickness of the semiconductor photo catalyst containing layer is preferably in a range of 0.05 to 10 μm.

b. Organopolysiloxane

Next, the organopolysiloxane used in the present invention will be explained. The organopolysiloxane used in the present invention is not particularly limited as long as it can lower the contact angle of semiconductor photo catalyst containing layer surface with respect to a liquid by the function of the semiconductor photo catalyst accompanied by the energy irradiation. In particular, those having a high bond energy such that the principal skeleton is not decomposed by the photo excitation of the semiconductor photo catalyst, and an organic substituent to be decomposed by the function of the semiconductor photo catalyst are preferable. Specifically, (1) an organopolysiloxane to provide high strength by hydrolysis or polycondensation of a chloro or alkoxy silane, or the like by the sol gel reaction or the like, (2) an organopolysiloxane obtained by cross-linking a reactive silicone having the excellent water repellent property or the oil repellent property, or the like can be presented.

In the case (1), it is preferably an organopolysiloxane as a hydrolyzed condensation product or a co-hydrolyzed condensation product of one or two or more kinds of silicon compounds represented by the general formula:

$$Y_n SiX_{(4-n)}$$

(Here, Y is an alkyl group, a fluoroalkyl group, a vinyl group, an amino group, a phenyl group, a chloroalkyl group, an isocyanate group, an epoxy group or an organic group containing them, and X is an alkoxyl group, an acetyl group or a halogen. n is an integer from 0 to 3). Here, the alkoxy group represented by X is preferably a methoxy group, an ethoxy group, a propoxy group, or a butoxy group. Moreover, the number of atoms of the entire organic group represented by Y is preferably in a range of 1 to 20, in particular, in a range of 5 to 10.

Thereby, at the time of forming the semiconductor photo catalyst containing layer, the surface can be provided with the liquid repellent property by the Y comprising the organopolysiloxane. Moreover, according to the function of the semiconductor photo catalyst accompanied by the energy irradiation, the lyophilic property can be provided by the decomposition of the Y, or the like.

Moreover, since the semiconductor photo catalyst containing layer before the energy irradiation can have the particularly high liquid repellent property in the case an organopolysiloxane having the Y comprising the organopolysiloxane as a fluoroalkyl group, it is preferable to use an organopolysiloxane having the fluoroalkyl group in the case a high liquid repellent property is required, or the like. As such an organopolysiloxane, specifically, a hydrolyzed condensation product or a co-hydrolyzed condensation product of one or two or more kinds of those known as a fluorine based silane coupling agent can be used. For example, those disclosed in JP-A No. 2001-074928 can be used.

Moreover, as the reactive silicone (2), compounds having a skeleton represented by the following general formula can be presented.

n is an integer of 2 or more, $R^1$, $R^2$ each are a substituted or non substituted alkyl, alkenyl, aryl or cyanoalkyl group having 1 to 10 carbon atoms, and 40% or less of the entirety based on the mole ratio is a vinyl, a phenyl, or a halogenated phenyl. Moreover, those having $R^1$, $R^2$ as a methyl group are preferable since the surface energy becomes the smallest, and it is preferable that a methyl group accounts for 60% or more based on the mole ratio. Moreover, at least one reactive group such as a hydroxyl group is provided in a molecular chain at the chain end or the side chain.

It is preferable that the organopolysiloxane is contained in the semiconductor photo catalyst containing layer from 5% by weight to 90% by weight, in particular, about from 30% by weight to 60% by weight.

c. Other Substances

Moreover, to the semiconductor photo catalyst containing layer used in the present invention, together with the organopolysiloxane, a stable organosilicon compound not to have the cross-linking reaction such as a dimethylpolysiloxane may be mixed to a binder. Furthermore, as a binder, a polysiloxane having a principal skeleton with a high bond energy not to be decomposed by the photo excitation of the semiconductor photo catalyst, not having an organic substituent, or having an organic substituent can be presented. Specifically, a hydrolysis or polycondensation product of a tetramethoxysilane, a tetraethoxysilane, or the like may be contained.

Furthermore, in order to aid the function of changing the wettability of the organopolysiloxane, or the like, a decomposable substance to be decomposed by the energy irradiation maybe contained. As such a decomposable substance, a surfactant to be decomposed by the function of the semiconductor photo catalyst, having the function of changing the wettability of the semiconductor photo catalyst containing layer surface according to the decomposition can be presented. Specifically, hydrocarbons of the respective series of NIKKO L BL, BC, BO, and BB manufactured by Nikko Chemicals Co., Ltd., and fluorine base or silicone base nonionic surfactants such as ZONYL FSN and FSO manufacture by Du Pont Kabushiki Kaisha, Surflon S-141 and 145 manufactured by ASAHI GLASS CO., LTD., Megaface F-141 and 144 manufactured by DAINIPPON INK AND CHEMICALS, Inc., FTERGENT F-200 and F251 manufactured by NEOS, UNIDYNE DS-401 and 402 manufactured by DAIKIN INDUSTRIES, Ltd., and Fluorad FC-170 and 176 manufactured by 3M can be cited, and cationic surfactants, anionic surfactants and amphoteric surfactants also can be used.

Other than the surfactants, oligomers and polymers such as polyvinyl alcohol, unsaturated polyester, acrylic resin, polyethylene, diallyl phthalate, ethylene propylene diene monomer, epoxy resin, phenol resin, polyurethane, melamine resin, polycarbonate, polyvinyl chloride, polyamide, polyimide, styrene-butadiene rubber, chloroprene rubber, polypropylene, polybutylene, polystyrene, polyvinyl acetate, nylon, polyester, polybutadiene, polybenzimidazole, polyacrylonitrile, epichlorohydrine, polysulfide, polyisoprene and the like can be cited.

d. Containment of the Fluorine

Moreover, according to the present invention, it is preferable that the semiconductor photo catalyst containing layer contains a fluorine, and furthermore, the semiconductor photo catalyst containing layer is formed so as to have the fluorine content of the semiconductor photo catalyst containing layer surface is lowered with respect to the state before the energy irradiation by the function of the semiconductor photo catalyst at the time an energy is irradiated to the semiconductor photo catalyst containing layer. Thereby, according to the irradiation of the energy, as it will be described later, a pattern having a part with a small fluorine content can be formed easily. Here, since the fluorine has an extremely low surface energy, the surface of a substance containing a large amount of a fluorine has a smaller critical surface tension. Therefore, the critical surface tension of a part with a small fluorine content is larger than the critical surface tension of the surface of a substance with a large fluorine content. That is, it denotes that the part with a small fluorine content becomes a lyophilic area compared with the part with a large fluorine content. Therefore, by forming a pattern comprising a part with a small fluorine content compared with the surface of the periphery, a pattern of a lyophilic area is formed in a liquid repellent area.

Therefore, in the case such a semiconductor photo catalyst containing layer is used, since a lyophilic area pattern can be formed easily in the liquid repellent area by the irradiation of the energy, in the case of coating a colored layer forming coating solution by the ink jet method, a highly precise colored layer can be formed.

As to the fluorine content in the semiconductor photo catalyst containing layer containing a fluorine as mentioned above, the fluorine content in the lyophilic area having a low fluorine content formed by the energy irradiation is 10 or less based on the fluorine content in the area without the energy irradiation as 100, it is preferably 5 or less, and it is particularly preferably 1 or less.

According to the range, a large difference can be generated in terms of the lyophilic property in the energy irradiated part and the unirradiated part. Therefore, by adhering for example a colored layer forming coating solution to such a semiconductor photo catalyst containing layer, the colored layer can be formed accurately in an opening part which is the lyophilic area with the fluorine content lowered so that a color filter good in precision can be obtained. The lowering ratio is based on the weight.

As to the measurement of the fluorine content in the semiconductor photo catalyst containing layer, various methods commonly executed can be used, and it is not particularly limited as long as it is a method capable of measuring the fluorine amount quantitatively on the surface such as the X-ray Photoelectron Spectroscopy, the ESCA (it is also referred to as the Electron Spectroscopy for Chemical Analysis), the fluorescent X ray analysis method, and the mass spectrometry.

Moreover, according to the present invention, a titanium dioxide can be used preferably as the semiconductor photo catalyst as mentioned above. As the fluorine content in the semiconductor photo catalyst containing layer in the case of using the titanium dioxide, it is preferable that the fluorine (F) element is contained in the semiconductor photo catalyst containing layer surface by the ratio with the fluorine (F) element of 500 or more, preferably 800 or more, and particularly preferably 1,200 or more with the premise that the titanium (Ti) element is 100 according to the analysis and quantification by the X-ray Photoelectron Spectroscopy.

Since the fluorine (F) is contained in the semiconductor photo catalyst containing layer to this extent, the critical surface tension on the semiconductor photo catalyst containing layer can be made sufficiently low so that the liquid repellent property in the surface can be ensured. Thereby, the wettability difference of the an opening part with the fluorine content reduced by the energy irradiation with respect to the surface lyophilic area can be made larger so that the precision of the color filter to be obtained finally can be improved.

Furthermore, according to such a color filter, as to the fluorine content in the lyophilic area formed by the energy pattern irradiation, it is preferable that the fluorine (F) element is contained by the ratio of 50 or less, preferably 20 or less, and particularly preferably 10 or less with the premise that the titanium (Ti) element is 100.

In the case the fluorine content in the semiconductor photo catalyst containing layer is reduced to this extent, a lyophilic property sufficient for forming a color filter can be obtained so that the color filter can be formed precisely according to the liquid repellent property and the wettability difference with respect to the part with the energy not irradiated, and thus a color filter having the high utilization value can be obtained.

e. Method for Forming a Semiconductor Photo Catalyst Containing Layer

As to the method for forming the semiconductor photo catalyst containing layer mentioned above, it can be formed by dispersing the semiconductor photo catalyst and organopolysiloxane in a solvent as needed with the other additives so as to prepare a coating solution, and coating the coating solution onto a base material with the light shielding part formed. As the solvent to be used, alcohol based organic solvents such as an ethanol and an isopropanol are preferable. The coating operation can be carried out by a known coating method such as spin coating, spray coating, dip coating, roll coating and bead coating. In the case an ultraviolet ray hardening type component is contained as a binder, the semiconductor photo catalyst containing layer can be formed with an execution of a hardening process by irradiating an ultraviolet ray. In the cases of any abovementioned coating methods is used, it is preferable to carry out the drying operation after coating not by drying by air but by natural drying and heat drying of the residual solvent with an infrared ray, or the like. Thereby, the stability of sensitivity and the sensitivity itself can be improved, and thus it is advantageous.

f. Method of Having the Opening Parts as a Lyophilic Region

Next, the method of directing an energy to the abovementioned semiconductor photo catalyst containing layer so as to have the opening parts as a lyophilic region will be explained. As mentioned above, the semiconductor photo catalyst containing layer has the contact angle with respect to a liquid lowered by the unction of the semiconductor photo catalyst accompanied by the energy irradiation. Therefore, by directing the energy from the base material side on the opposite side with respect to the side with the semiconductor photo catalyst containing layer formed, the contact angle with respect to a liquid of the semiconductor photo catalyst containing layer can be lowered by directing he energy only to the opening parts without changing the contact angle with respect to a liquid of the semiconductor photo catalyst containing layer in the region with the light shielding part formed.

Here, as to the energy to be directed to the semiconductor photo catalyst containing layer, the method thereof is not particularly limited as long as it is a method capable of directing an energy for lowering the contact angle with respect to a liquid of the semiconductor photo catalyst containing layer. The energy irradiation (exposure) in the present invention is the concept including the irradiation of any energy line capable of lowering the contact angle with respect to a liquid of the semiconductor photo catalyst containing layer surface, and thus it is not limited to the visible light beam irradiation.

For the energy irradiation, in general, the light wavelength can be set in a range of 400 nm or less, preferably in a range of 150 nm to 380 nm or less because the preferable semiconductor photo catalyst used for the semiconductor photo catalyst containing layer is a titanium dioxide as mentioned above, and a light having the above-mentioned wavelength is preferable as the energy for activating the semiconductor photo catalyst function by the titanium dioxide.

As a light source to be used for the energy irradiation, a mercury lamp, a metal halide lamp, a xenon lamp, an excimer lamp, and various other light sources can be presented. Moreover, in addition to the method of executing the irradiation using the light source mentioned above, a method of irradiating an energy using a laser such as an excimer, a YAG, or the like can be used as well.

The energy irradiation amount at the time of the energy irradiation is defined to be the irradiation amount necessary for lowering the contact angle with respect to a liquid of the semiconductor photo catalyst containing layer surface by the function of the semiconductor photo catalyst in the semiconductor photo catalyst containing layer.

At the time, by irradiating the energy while heating the semiconductor photo catalyst containing layer, the sensitivity can be further raised so that the contact angle with respect to a liquid of the semiconductor photo catalyst containing layer surface can be lowered efficiently, and thus it is preferable in this regard. Specifically, it is preferable to heat in a range of 30° C. to 80° C.

The present invention is not limited to the embodiments. The embodiments are merely examples, and any one having the substantially same configuration as the technological idea disclosed in the claims of the present invention and the same effects is included in the technological scope of the present invention.

EXAMPLES

Hereinafter, the present invention will be explained in further detail with reference to the examples.

Example 1

1. Formation of the Light Shielding Part

A mixture of the below-mentioned composition was dissolved by heating at 90° C. and carrying out the centrifugal separation at 12,000 rpm, and then it was filtrated with a 1 μm glass filter. By adding 1% by weight of an ammonium dichromate as a cross linking agent to the obtained water based coloring resin solution, a paint for the light shielding part was prepared.

| | |
|---|---|
| Carbon black (produced by Mitsubishi Chemical Corporation #950) | 4 parts by weight |
| Polyvinyl alcohol (produced by Nippon Synthetic Chemical Industry Co., Ltd., GOHSENOL AH-26) | 0.7 part by weight |
| Ion exchange water | 95.3 parts by weight |

A light shielding film (resist) pattern was formed using the obtained paint for a light shielding part for the evaluation. First, the above-mentioned paint for the light shielding part was coated onto a sodium glass transparent base material with a spin coater and dried by a hot plate at 80° C. for 1 minute. The film thickness after the drying operation measured by a stylus film thickness meter (α-step, produced by KLA-Tencor Corporation) was 1 μm. Next, the sample was image-exposed with a mercury lamp through a mask. Subsequently, it was soaked in a developing agent containing 0.05% of a potassium hydroxide and 0.1% of a nonionic surfactant (EMULGEN A-60 produced by KAO CORPORATION) at 25° C. for development so as to obtain a light shielding pattern. Thereafter, by carrying out a drying operation at 60° C. for 3 minutes and exposing with a mercury lamp, the paint for the light shielding part was hardened. Furthermore, by applying a heat treatment at 150° C. for 30 minutes, a light shielding part was formed. At the time, as to the shape of the light shielding part, one comprising a plurality of the linear light shielding parts (width=20 μm) formed by an equal interval with a predetermined gap (width=200 μm) and the interlocking light shielding parts for interlocking the linear light shielding parts by a predetermined interval was provided. As to the shape of the interlocking light shielding parts, it was provided as a shape shown in FIG. 2 such that the average width of the inner side two regions out of the regions provided by dividing the distance between the adjacent linear light shielding parts equally into four, that is, the interlocking light shielding parts at the central part was 50 μm, and the average width of the outer side two regions out of the regions provided by dividing the distance between the linear light shielding parts equally into four, that is, the interlocking light shielding parts at the side part of the linear light shielding part was 20 μm.

2. Formation of the Photo Catalyst Containing Layer 30 g of an isopropyl alcohol, 0.4 g of MF-160E containing a fluoroalkylsilane as the main component (manufactured by Tohkem Co., Ltd.), 3 g of a trimethoxymethylsilane (manufactured by GE Toshiba Silicones, TSL 8113), and 20 g of ST-K01 (manufactured by ISHIHARA SANGYO KAISHA, LTD.) as a photo catalyst as a titanium oxide aqueous dispersion were mixed and agitated at 100° C. for 20 minutes. The same was diluted by an isopropyl alcohol to 3 times so as to provide a semiconductor photo catalyst containing layer composition.

By coating the composition onto a sodium glass transparent base material with the light shielding part formed by a spin coater and carrying out a drying process at 150° C. for 10 minutes, a transparent photo catalyst containing layer (0.2 μm thickness) was formed.

3. Confirmation of the Formation of the Lyophilic Region by the Exposure

Using the above-mentioned photo catalyst containing layer, energy irradiation was carried our from the base material side by a mercury lamp (365 nm wavelength) by a 70 mW/cm$^2$ luminance for 50 seconds, and the contact angles with respect to a liquid of the non exposed part and the exposed part were measured. As to the non exposed part, the contact angle was measured with respect to a liquid of 30 mN/m a surface tension (manufactured by JUNSEI CHEMICAL, CO., LTD., an ethyleneglycolmonoethylether) was measured (30 seconds after of dropping liquid droplets from a micro syringe) using a contact angle measuring device (CA-Z type manufactured by Kyowa Interface Science, Co., Ltd.), and it was 30°. Moreover, as to the exposed part, the contact angle was measured with respect to a liquid of a 50 mN/m surface tension (manufactured by JUNSEI CHEMICAL, CO., LTD., a wetting index standard solution No. 50) in the same manner, and it was 7°. Accordingly, it was confirmed that the exposed part has become a lyophilic area so that the pattern formation according to the difference of the wettability of the exposed part and the non exposed part can be enabled.

4. Formation of the Colored Layer

Next, the base material with the above-mentioned light shielding part and photo catalyst containing layer formed was exposed by the entire surface from the base material side using the same energy as mentioned above so as to have the opening parts sectioned by the light shielding part as lyophilic. Next, using an ink jet device, UV hardening type polyfunctional acrylate monomer inks each of RGB color containing 5 parts by weight of a pigment, 20 parts by weight of a solvent, 5 parts by weight of a polymerization initiating agent and 70 parts by weight of a UV hardening resin were adhered between the above-mentioned adjacent two linear light shielding parts so as to cover the above-mentioned interlocking light shielding parts for coloring. By carrying out the UV process thereto, they were hardened. Here, for each of the red, green and blue inks, a polyethylene glycol monomethyl ethyl acetate was used as the solvent, IRGACURE 369 (product name, produced by Chiba Specialty Chemicals) as the polymerization initiating agent, and a DPHA (dipentaerythritol hexaacrylate (produced by NIPPON KAYAKU CO., LTD.)) as the UV hardening resin. Moreover, as to the pigment, for the red ink, C. I. Pigment Red 177, for the green ink, C. I. Pigment Green 36, and for the blue ink, C. I. Pigment Blue 15 +C. I. Pigment violet 23 were used, respectively.

5. Formation of the Protection Layer

Next, as to the protection layer, by coating a two liquid mixing type thermosetting agent (produced by JSR Corporation, SS7265) by a spin coater and applying a hardening process at 200° C. for 30 minutes, a protection layer was formed so as to obtain a color filter. The obtained color filter was of a high quality without a color void or color Irregularity in the colored layer.

Example 2

1. Formation of the Photo Catalyst Containing Layer

The photo catalyst containing layer was formed on a transparent base material with a light shielding part formed with a chromium by the sputtering method in the same manner as in the example 1. The shape of the light shielding part comprises a plurality of the linear light shielding parts (width=20 μm) formed by an equal interval with a predetermined gap (width=200 μm) and the interlocking light shielding parts for interlocking the linear light shielding parts by a predetermined interval. As to the shape of the interlocking light shielding parts, as shown in FIG. 3, the interlocking light shielding parts and the linear light shielding parts are formed so as not to be contacted with each other such that the width of the interlocking light shielding parts was 25 μm, the length between the end part to the end part of the interlocking light shielding parts between the two linear light shielding parts was 150 μm, and the interval between the both end parts of the interlocking light shielding parts 2 and the linear light shielding part end part was 25 μm, respectively.

2. Formation of the Colored Layer

Next, by the entire surface exposure with a metal halide lamp (365 nm wavelength, 1,000 mJ) from the above-mentioned base material side, the opening parts sectioned by the light shielding part were processed to be a lyophilic region (7 degrees or less converted to the contact angle with respect to a liquid having a 50 mN/m surface tension). Subsequently, using an ink jet device, the same UV hardening type polyfunctional acrylate monomer inks of the RGB colored as those used in the example 1 were adhered between the above-mentioned adjacent two linear light shielding parts so as to cover the interlocking light shielding parts for coloring, and they were hardened by carrying out the UV process.

3. Formation of the Protection Layer

As to the protection layer, by coating a two liquid mixing type thermosetting agent (produced by JSR Corporation, SS7265) by a spin coater and applying a hardening process at 200° C. for 30 minutes, a protection layer was formed so as to obtain a color filter. The obtained color filter was of a high quality without a color void or color irregularity in the colored layer as that of the example 1.

Example 3

1. Formation of the Resin Light Shielding Layer

Using a resin carbon black (produced by Mitsubishi Chemical Corporation, Ltd. #950), a light shielding part was formed on a transparent glass base material by the same method as in the example 1. At this time, the shape of the light shielding part comprises a plurality of the linear light shielding parts (width=200 μm) formed by an equal interval with a predetermined gap (width=20 μm) and the interlocking light shielding parts for interlocking the linear light shielding parts by a predetermined interval. As to the shape of the interlocking light shielding parts, it was provided as a shape shown in FIG. 2 such that the average width of the inner side two regions out of the regions provided by dividing the distance between the adjacent linear light shielding parts equally into four, that is, the interlocking light shielding parts at the central part was 50 μm, and the average width of the outer side two regions out of the regions provided by dividing the distance between the linear light shielding parts equally into four, that is, the interlocking light,shielding parts at the side part of the linear light shielding part was 20 μm.

2. Formation of the Colored Layer by an Atmospheric Pressure Plasma

Next, the base material with the above-mentioned light shielding part formed was processed with an atmospheric pressure plasma by the following conditions. Thereby, a fluorine was introduced onto the light shielding part so as to provide a liquid repellent region (27 degrees converted to the contact angle with respect to a liquid having a 30 mN/m surface tension). As to the opening parts sectioned by the light shielding part having the base material exposed, it can be used as a lyophilic region (7 degrees or less converted to the contact angle with respect to a liquid having a 50 mN/m surface tension) without introduction of a fluorine.

(Atmospheric Pressure Plasma Irradiation Conditions)

Introducing gas: $CF_4$ . . . 10 (1/min)

Interval between the electrode and the substrate: 2 mm

Power source output: 200-5 A

Conveyance rate: 0.25 m/min

Subsequently, using an ink jet device, the same UV hardening type polyfunctional acrylate monomer inks of the RGB colors as those used in the example 1 were adhered between the above-mentioned adjacent two linear light shielding parts so as to cover the above-mentioned interlocking light shielding parts for coloring, and they were hardened by carrying out the UV process.

3. Formation of the Protection Layer

As to the protection layer, by coating a two liquid mixing type thermosetting agent (produced by JSR Corporation, SS7265) by a spin coater and applying a hardening process at 200° C. for 30 minutes, a protection layer was formed so as to obtain a color filter The obtained color filter was of a high quality without a color void or color irregularity in the colored layer as that in the example 1.

Comparative Example 1

1. Formation of the Resin Light Shielding Layer

Using a resin carbon black (produced by Mitsubishi Chemical Corporation, Ltd. #950) in the same manner as in the example 1, a light shielding part was formed on a transparent glass base material. The shape of the light shielding part comprises a plurality of the linear light shielding parts (width=20 μm) formed by an equal interval with a predetermined gap (width=200 μm) and the interlocking light shielding parts for interlocking the linear light shielding parts by a predetermined interval. As to the shape of the interlocking light shielding parts, the width was 25 μm, and the length from the end part to the end part of the interlocking light shielding parts between the two linear light shielding parts was 250 μm. The above-mentioned interlocking light shielding parts were formed so as to cross with the linear light shielding parts such that the opening parts sectioned by the light shielding part were rectangular (200 μm×600 μm).

2. Formation of the Photo Catalyst Containing Layer

Subsequently, in the same manner as in the example 1, a photo catalyst containing layer was formed on the base material with the above-mentioned light shielding part formed.

3. Formation of the Colored Layer

Next, the base material with the photo catalyst containing layer formed on the light shielding part was exposed by the entire surface from the base material side in the same manner as in the example 1 for having the opening parts sectioned by the light shielding parts as lyophilic. Subsequently, using an ink jet device, the same UV hardening type polyfunctional acrylate monomer inks of the RGB colors as those used in the example 1 were adhered between the above-mentioned adjacent two linear light shielding parts so as to cover the above-mentioned interlocking light shielding parts for coloring, and they were hardened by carrying out the UV process.

4. Formation of the Protection Layer

As to the protection layer, by coating a two liquid mixing type thermosetting agent (produced by JSR Corporation, SS7265) by a spin coater and applying a hardening process at 200° C. for 30 minutes, a protection layer was formed so as to obtain a color filter. According to the optical microscope observation of the obtained color filter, the voids were observed near the corners of the opening parts 5 sectioned by the light shielding part 4 as shown in FIG. 8 without neatly spreading the UV hardening type polyfunctional acrylate monomer inks near the corners of the opening parts.

What is claimed is:

1. A color filter comprising a base material, a light shielding part having a plurality of linear light shielding parts formed by a predetermined equal interval on the base material and interlocking light shielding parts for interlocking two of the light shielding parts adjacent by a predetermined interval, and colored layers formed between each of the linear light shielding parts so as to cover the interlocking light shielding parts, wherein the linear light shielding parts and the interlocking light shielding parts are formed so as not to be contacted, and wherein, the colored layers are formed by an ink jet method.

2. The color filter according to claim 1, wherein a semiconductor photo catalyst containing layer containing a semiconductor photo catalyst and an organopolysiloxane is formed so as to cover the base material and the light shielding part.

3. The color filter according to claim 1, wherein the light shielding part contains a fluorine.

* * * * *